US012638312B2

(12) United States Patent (10) Patent No.: US 12,638,312 B2
Masuda (45) Date of Patent: May 26, 2026

(54) ROTATION DETERMINATION DEVICE

(71) Applicant: U-SHIN LTD., Nagano (JP)

(72) Inventor: Makiko Masuda, Hiroshima (JP)

(73) Assignee: U-SHIN LTD., Nagano (JP)

( * ) Notice: Subject to any disclaimer, the term of this patent is extended or adjusted under 35 U.S.C. 154(b) by 332 days.

(21) Appl. No.: 18/262,209

(22) PCT Filed: Jan. 13, 2022

(86) PCT No.: PCT/JP2022/001005
§ 371 (c)(1),
(2) Date: Jul. 20, 2023

(87) PCT Pub. No.: WO2022/168563
PCT Pub. Date: Aug. 11, 2022

(65) Prior Publication Data
US 2024/0068847 A1 Feb. 29, 2024

(30) Foreign Application Priority Data
Feb. 2, 2021 (JP) ................................. 2021-015327

(51) Int. Cl.
G01D 5/249 (2006.01)
G01D 5/244 (2006.01)
(52) U.S. Cl.
CPC ............. G01D 5/249 (2013.01); G01D 5/244 (2013.01)
(58) Field of Classification Search
CPC .... G01D 5/249; G01D 5/244; G01D 2205/85; G01D 5/2451; G01P 13/04
(Continued)

(56) References Cited

U.S. PATENT DOCUMENTS

2008/0290261 A1* 11/2008 Doe ..................... G01D 5/3473
250/221

FOREIGN PATENT DOCUMENTS

JP 02-118822 U 9/1990
JP 09-243403 A 9/1997
(Continued)

OTHER PUBLICATIONS

Ouyang, Yohanes. 'ARM Cortex-M3 (STM32F103) Tutorial—Incremental Rotary Encoder'. In Embedded System Engineering Electronics and Computer Engineering Blog) [online]. Jul. 1, 2016 (Year: 2016).*

(Continued)

*Primary Examiner* — Kristina M Deherrera
(74) *Attorney, Agent, or Firm* — Chrisman Gallo Tochtrop LLC

(57) ABSTRACT

The present invention provides a rotation determination device capable of determining a rotational operation of a rotating body even if started from an intermediate position, comprising: an encoder section that generates two pulse signals out of phase with each other by the rotating body's rotation; an acquisitor that acquires the levels of two pulse signals; a detector that detects signal changes in two pulse signals; an edge pattern determiner that determines an edge pattern from one pulse signal with detected signal change and an input signal level of the other pulse signal, when the detector detects the signal change; a setter that sets a reference signal level with the input signal level as an initial value. When a specific edge pattern that changes according to the reference signal level matches the edge pattern determined by the edge pattern determiner, a rotation determiner determines the rotational operation of the rotating body.

4 Claims, 13 Drawing Sheets

(58) Field of Classification Search
USPC ............................................................. 33/1
See application file for complete search history.

(56) References Cited

FOREIGN PATENT DOCUMENTS

| | | | |
|---|---|---|---|
| JP | 09-280891 | A | 10/1997 |
| JP | 2002-041226 | A | 2/2002 |
| WO | 2006/003230 | A1 | 1/2006 |

OTHER PUBLICATIONS

STM32 Data Sheet (Year: 2010).*
International Search Report for corresponding International Application No. PCT/JP2022/001005 mailed Mar. 22, 2022.
Written Opinion for corresponding International Application No. PCT/JP2022/001005 dated Mar. 22, 2022.

* cited by examiner

1

Encoder power (5V)

CPU power (5V)

100

Phase B input signal

200

120    121

CPU

110

210
Acquisitor

220
Detector

111

112

230
Edge pattern determiner

113

240
Setter

250
Rotation determiner

Phase A input signal

Fig.5

| | | Step S150 | | | |
|---|---|---|---|---|---|
| | | Phase A input signal level a | | Phase B input signal level b | |
| | | L | H | L | H |
| Step S140 | Detect changes in phase A input signal | | | E1 | E2 |
| | Detect changes in phase B input signal | E3 | E4 | | |

Fig.8

| | Specific edge pattern | |
| --- | --- | --- |
| | First edge pattern | Second edge pattern |
| Reference signal levels $(\alpha, \beta) = (H,L)$ | E2 | E3 |
| Reference signal levels $(\alpha, \beta) = (L,H)$ | E1 | E4 |
| Reference signal levels $(\alpha, \beta) = (L,L)$ | E1 | E3 |
| Reference signal levels $(\alpha, \beta) = (H,H)$ | E2 | E4 |

ROTATION DETERMINATION DEVICE

TECHNICAL FIELD

The present invention relates to a rotation determination device.

BACKGROUND ART

Conventionally, dials have been used to set temperature and air volume of vehicle air conditioners, and there are some that use encoders to determine a rotational operation of these dials.

A method has been proposed to prevent incorrect determination and accurately determine the rotational operation when such an encoder is used.

For example, a rotation determination method that can prevent incorrect determination due to a chattering by detecting the rising and falling edges of two-phase pulse signals output from the encoder and determining count-up or count-down according to the edge state of one pulse signal whose edge is detected and the signal level of the other pulse signal is disclosed (see, for example, Patent Document 1).

When determining the rotational operation by pulse signal edges, as in the conventional technology described above, it is common to set so that either edge of a two-phase pulse signal is detected in the vicinity of a dial stop position.

When a dial operation start position is between two adjacent dial stop positions, i.e., an intermediate position, and the dial is rotationally operated from the intermediate position to one of the dial stop positions, only the rising or falling edge of one of the two-phase pulse signals is detected.

PATENT DOCUMENT

Patent Document 1: Japanese Unexamined Utility Model (Registration) Application Publication No. 1990-118822.

SUMMARY OF INVENTION

Technical Problem

However, in the technology described in Patent Document 1, it is necessary to detect the edges of both two-phase pulse signals in order to determine the rotational operation of the dial. Therefore, when the power is supplied to the device for determining the rotational operation of the dial and the dial is rotated from the intermediate position, there was a problem that it cannot be determined at the position where it should be determined that the dial has been rotated.

Therefore, in view of the above-mentioned problems, the purpose of the present invention is to provide the rotation determination device capable of determining the rotational operation even if the dial operation start position is the intermediate position.

Solution to Problem

Embodiment 1: One or more embodiments of the present invention propose a rotation determination device comprising:

an encoder connected to a rotating body and configured to generate two pulse signals that are out of phase with each other due to a rotation of the rotating body;

a detector configured to detect a rising edge and a falling edge of the two pulse signals as a signal change;

an acquisitor configured to acquire the levels of the two pulse signals received from the encoder as an input signal level;

an edge pattern determiner configured to determine an edge pattern from one pulse signal in which the signal change is detected and the input signal level in the other pulse signal, when the signal change is detected in either of the two pulse signals by the detector;

a setter configured to set a reference signal level with the input signal levels as an initial value; and a rotation determiner configured to determine that the rotating body has been rotationally operated when a specific edge pattern among the edge patterns is changed according to the reference signal level and the edge pattern determined by the edge pattern determiner is the specific edge pattern.

The rotation determination device in one or more embodiments of the present invention comprises:

the encoder configured to generate two pulse signals;

the acquisitor configured to acquire the levels of the two pulse signals;

the detector configured to detect changes in two pulse signals;

the setter configured to set the reference signal levels;

the edge pattern determiner configured to acquire the signal level and determine the edge pattern when a change in either of the two pulses is detected; and the rotation determiner configured to determine whether the rotating body is rotationally operated. The rotation determiner determines that the rotating body has rotated when the specific edge pattern determined by the reference signal level matches the edge pattern determined by the edge pattern determiner.

In other words, in the rotation determination device, the reference signal level is set at the operation start position of the rotating body, and when the edge pattern determined by the signal level change detected in one of the two pulse signals matches the specific edge pattern set by the reference signal level, the rotating body is determined to have been rotationally operated.

Therefore, even if the operation start position of the rotating body is at the intermediate position, since the reference signal level is set at the intermediate position, the rotational operation of the rotating body can be determined. Embodiment 2: One or more embodiments of the present invention propose the rotation determination device in which the specific edge pattern is distinguished between a first edge pattern and a second edge pattern, and the rotating body is determined to have been rotationally operated clockwise when the edge pattern is the first edge pattern, and the rotating body is determined to have been rotationally operated counterclockwise when the edge pattern is the second edge pattern.

In other words, the rotation determination device distinguishes the specific edge patterns determined based on the reference signal levels in to two: the first edge pattern and the second edge pattern.

Therefore, since the specific edge pattern configured to determine that the rotating body has been rotationally operated is distinguished into the first edge pattern configured to determine that the rotating body has been rotationally operated clockwise and the second edge pattern configured to determine that the rotating body has been rotationally operated counterclockwise, the direction of the rotational operation can be determined.

Embodiment 3: One or more embodiments of the present invention propose the rotation determination device, in which when the edge pattern is the specific edge pattern, the reference signal level is updated to the input signal level of when the specific edge pattern is determined.

That is, in the rotation determination device, when the edge pattern matches the specific edge pattern, the reference signal level is updated to the input signal level of when the edge pattern matches the specific edge pattern.

Therefore, the successive rotational operations of the rotating body can be correctly determined.

Advantageous Effect of Invention

According to one or more embodiments of the invention, an effect is that the rotational operation of the rotating body can be correctly determined even if the operation start position of the rotating body is in the intermediate position.

BRIEF DESCRIPTION OF DRAWINGS

FIG. 5 shows an edge pattern determination process of the rotation determination device according to the embodiment of the present invention.

FIG. 8 shows the setting of edge patterns for each reference signal level in the rotation determination process of the rotation determination device according to the embodiment of the present invention.

DESCRIPTION OF EMBODIMENTS

Embodiment

The rotation determination device 1 according to the present embodiment will be described with reference to FIG. 1 to FIG. 13.

<Configuration of Rotation Determination Device 1>

Figure 1:
FIG. 1 shows the configuration of the rotation determination device according to the embodiment of the present invention.

The rotation determination device 1 according to the present embodiment is, for example, a rotation determination device for a temperature control dial of a vehicle air conditioner, and comprises an encoder section 100 and a CPU 200, as shown in FIG. 1.

<Configuration of Encoder Section 100>

The encoder section 100 comprises an encoder 110, a resistor 120, and a resistor 121, as shown in FIG. 1.

Figure 2:
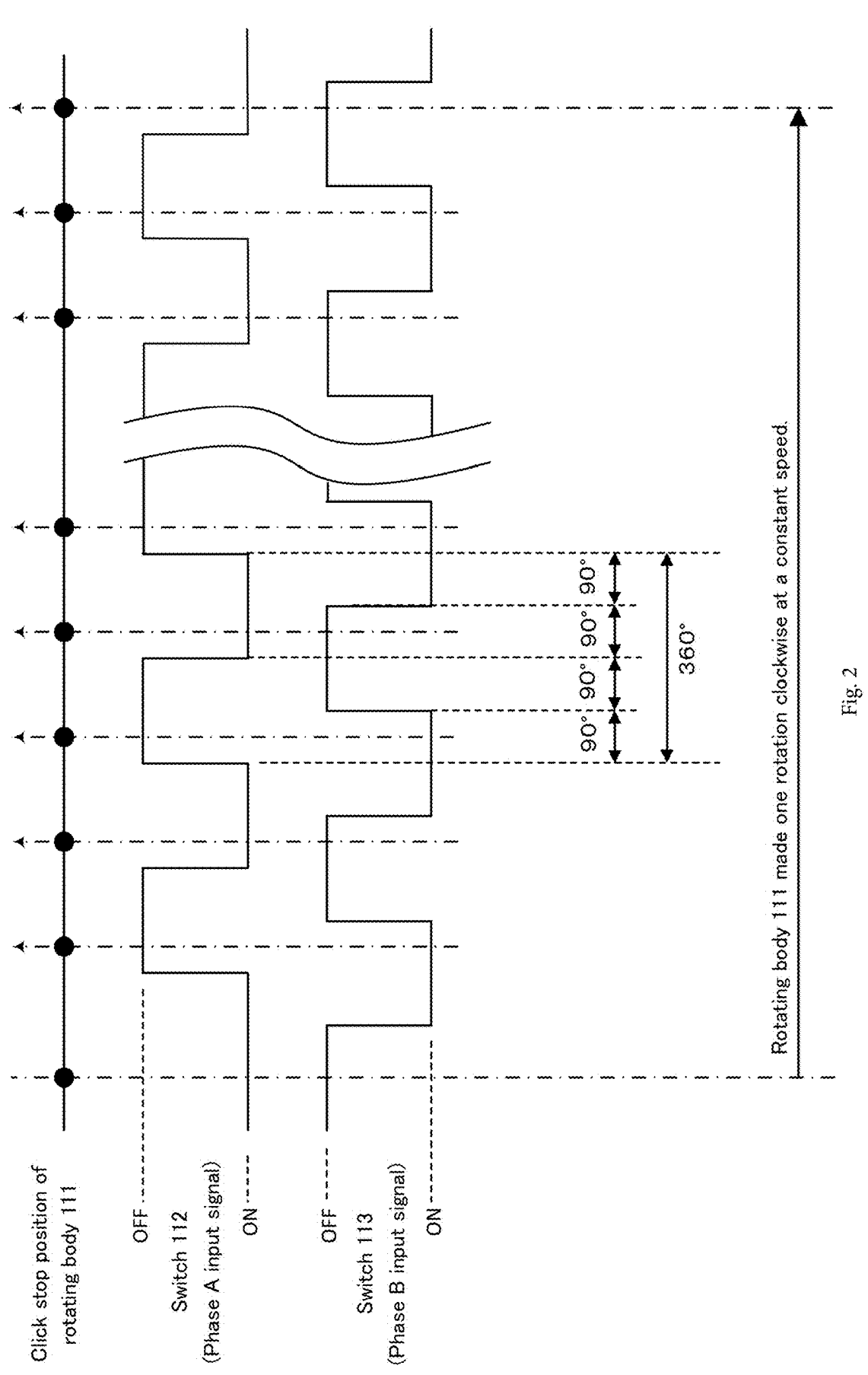
FIG. 2 shows the operation of the encoder of the rotation determination device according to the embodiment of the present invention.
Figure 3:
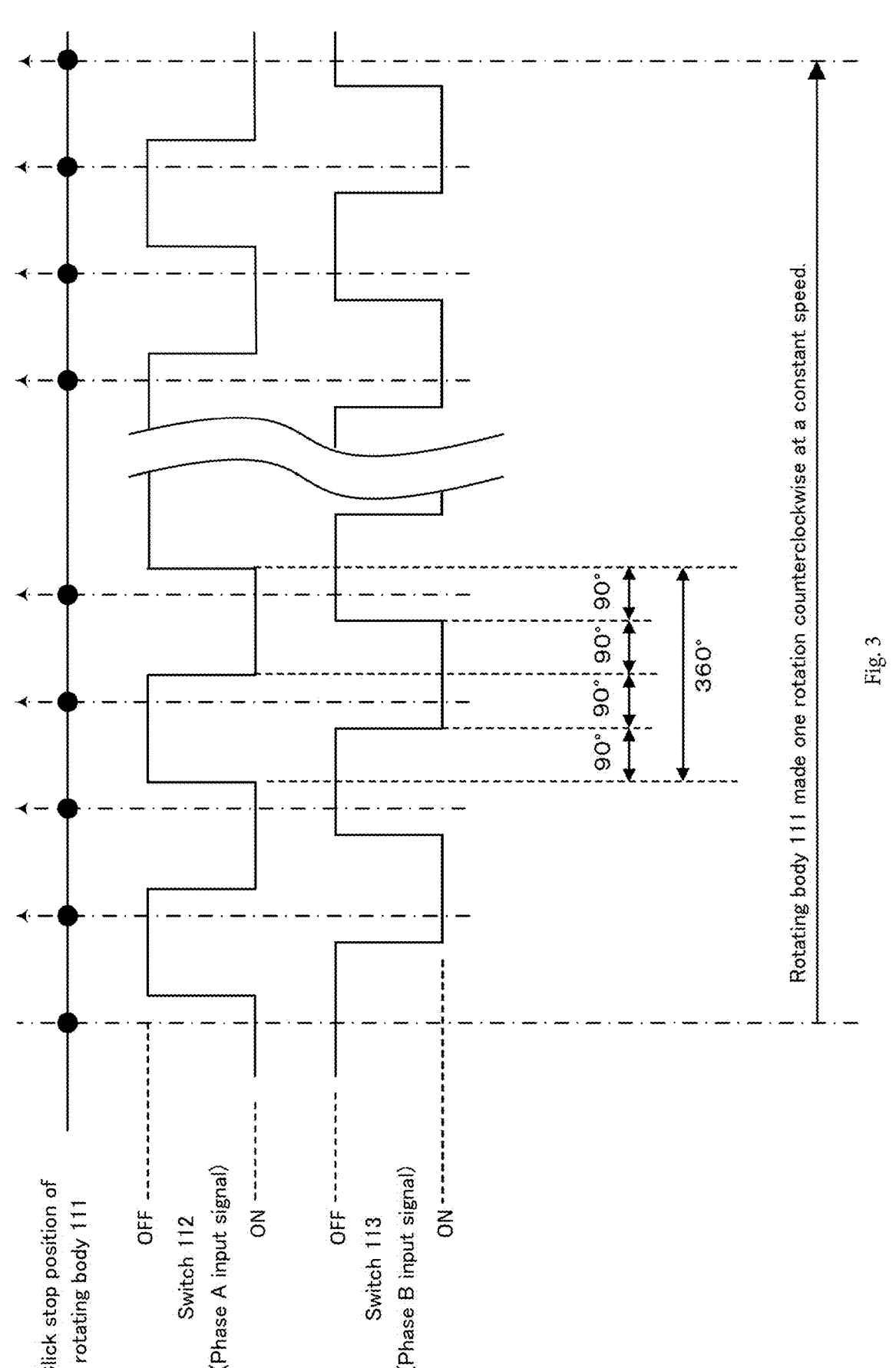
FIG. 3 shows the operation of the encoder of the rotation determination device according to the embodiment of the present invention.

The encoder section 100 has a structure that generates a click when a rotating body 111 is rotationally operated, and stops at a click stop position indicated by the black circle in FIG. 2 and FIG. 3.

The encoder 110 comprises the rotating body 111, a switch 112, and a switch 113, as shown in FIG. 1.

The rotating body 111 is a dial that is rotationally operated when setting the temperature of the vehicle air conditioner.

Switches 112 and 113 comprise mechanical sliding contacts, for example, and are switched on and off in conjunction with the rotation of the rotating body 111.

For example, as shown in FIG. 2, there is a 90° phase difference between the on and off of the switch 112 and the switch 113, and when the rotating body 111 is rotationally operated clockwise from the click stop position, the on and off of the switch 113 changes prior of that of the switch 112.

As shown in FIG. 3, when the rotating body 111 is rotationally operated counterclockwise from the click stop position, the on and off of the switch 112 changes prior to that of the switch 113.

One end of the switch 112 is connected to one end of the switch 113 and to ground of the rotation determination device 1.

The other end of the switch 112 is connected to one end of the resistor 120 and to the CPU 200.

The signal received from the other end of the switch 112 to the CPU 200 is a signal indicating the state of the switch 112 (phase A input signal).

The other end of the switch 113 is connected to one end of the resistor 121 and to the CPU 200.

The signal received from the other end of the switch 113 to the CPU 200 is a signal indicating the state of the switch 113 (phase B input signal).

The other end of the resistor 120 is connected to the other end of the resistor 121, and is also connected to an encoder power (5 V).

In the case of the rotation determination device 1 installed in a vehicle, encoder power (5 V) is supplied to the encoder section 100 by the CPU 200 controlling an unshown switching element, after CPU power (5 V) is supplied to the CPU 200.

The CPU 200 is supplied with CPU power (5 V) in conjunction with an ACC (accessory) switch or an IG (ignition) switch.

<Configuration of CPU 200>

As shown in FIG. 1, the CPU 200 comprises an acquisitor 210, a detector 220, an edge pattern determiner 230, a setter 240, and a rotation determiner 250.

The acquisitor 210, the detector 220, the edge pattern determiner 230, the setter 240, and the rotation determiner 250 are functions of some of the CPU 200 equipped with well-known RAM, ROM, and I/O bus, etc. (not shown).

In the CPU 200, control of the entire rotation determination device 1 is executed according to a control program stored in ROM.

For example, when CPU power (5 V) is supplied to the CPU 200, processing of the rotation determination device 1 starts, and when CPU power (5 V) is cut off, processing of the rotation determination device 1 is terminated.

In the acquisitor 210, the signal levels of the phase A input signal and phase B input signal received from the encoder section 100 are acquired.

In the detector 220, the rising and falling edges of the phase A input signal and the phase B input signal received from the encoder section 100 are detected.

Specifically, the phase A input signal and the phase B input signal are connected to the edge detectable input terminals of the CPU 200. Based on the phase A input signal and the phase B input signal received by the detector 220 via these input terminals, the rising and falling edges of the phase A input signal and the phase B input signal are detected.

In the edge pattern determiner 230, edge pattern is determined based on the signal level acquired by the acquisitor 210 and the input signal for which rising or falling edges are detected in the detector 220.

The edge pattern determination process is described further below.

In the setter 240, the reference signal levels are set based on the signal levels acquired by the acquisitor 210.

The setting of the reference signal levels is described further below.

In the rotation determiner 250, whether the rotating body 111 is rotationally operated is determined based on the edge pattern determined in the edge pattern determiner 230 and the reference signal levels set in the setter 240.

The rotation determination process is described further below.

<Processing of Rotation Determination Device 1>

Processing of the rotation determination device 1 according to the present embodiment will be described with reference to FIG. 4 to FIG. 8.

Figure 4:
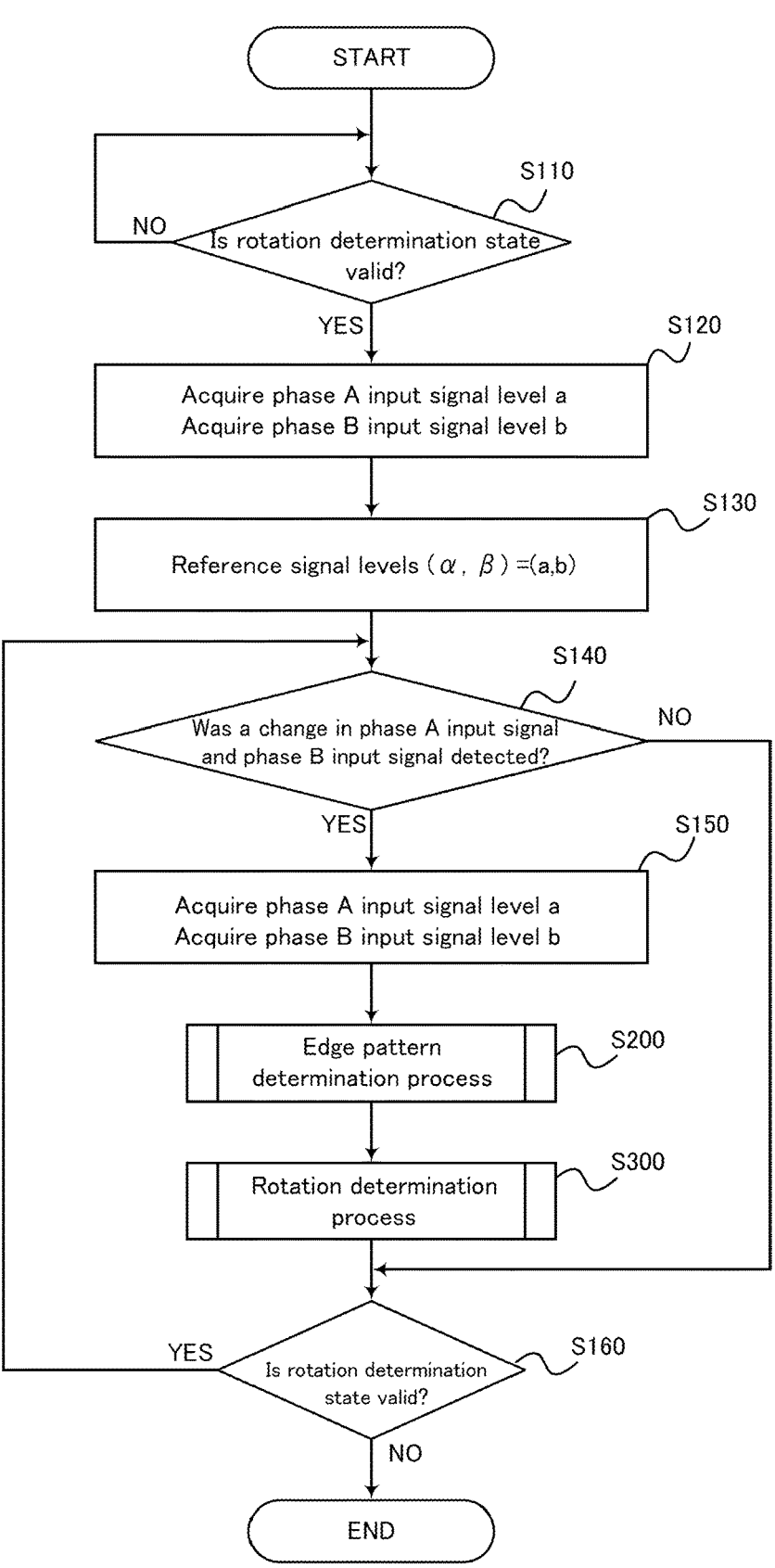
FIG. 4 is a process flow diagram of the rotation determination device according to the embodiment of the present invention.

A process of determining the rotational operation of the rotating body 111 will be described with reference to FIG. 4.

At the CPU 200, whether a rotation determination state is valid is determined (step S110).

When the CPU 200 determines that a rotation determination state is valid ("YES" in step S110), the process moves to step S120.

When the CPU 200 determines that the rotation determination state is not valid ("NO" in step S110), the process returns to step S110 and waits.

The rotation determination state is set to valid when the CPU power is supplied to the CPU 200, or is set to valid by the user operating an operation switch (not shown in the figure) after the CPU power is supplied to the CPU 200.

In the acquisitor 210, a phase A input signal level a and a phase B input signal level b are acquired (step S120).

In other words, the phase A input signal level a and the phase B input signal level b before the rotating body 111 is rotationally operated, are acquired by the acquisitor 210.

The signal levels acquired by the acquisitor 210 are a high level (hereinafter referred to as "H") or a low level (hereinafter referred to as "L").

Next, in the setter 240, the reference signal levels (α, β) are set based on the signal levels acquired by the acquisitor 210 (step S130).

In other words, the phase A input signal level a and the phase B input signal level b before the rotating body 111 is rotationally operated acquired by step S120, are set as the reference signal levels (α, β)=(a, b) at the setter 240.

Next, in the detector 220, it is determined whether there is a change in the phase A input signal or the phase B input signal (step S140).

In other words, the rising or falling edges of the phase A input signal and the phase B input signal are detected in the detector 220.

If a signal change is detected in the detector 220 ("YES" in step S140), the process moves to step S150.

If the signal change is not detected in the detector 220 ("NO" in step S140), the process moves to step S160.

Next, the phase A input signal level a and the phase B input signal level b are acquired by the acquisitor 210 (step S150).

Based on the input signal whose rising or falling edge is detected by the detector 220 in step S140 and the signal level acquired by the acquisitor 210 in step S150, the edge pattern determination process is executed by the edge pattern determiner 230 (step S200).

The edge pattern determination process (step S200) is described further below.

Next, in the rotation determiner 250, the rotation determination process of the rotating body 111 is executed based on the edge pattern determined in step S200 (step S300).

The rotation determination process (step S300) processed in the rotation determiner 250 is described further below.

At the CPU 200, whether the rotation determination state is valid is determined (step S160).

When the CPU 200 determines that the rotation determination state is valid ("YES" in step S160), the process is returned to step S140 and processing continues.

When the CPU 200 determines that the rotation determination state is not valid ("NO" in step S160), the process is terminated.

<Edge Pattern Determination Process (Step S200)

Figure 6:
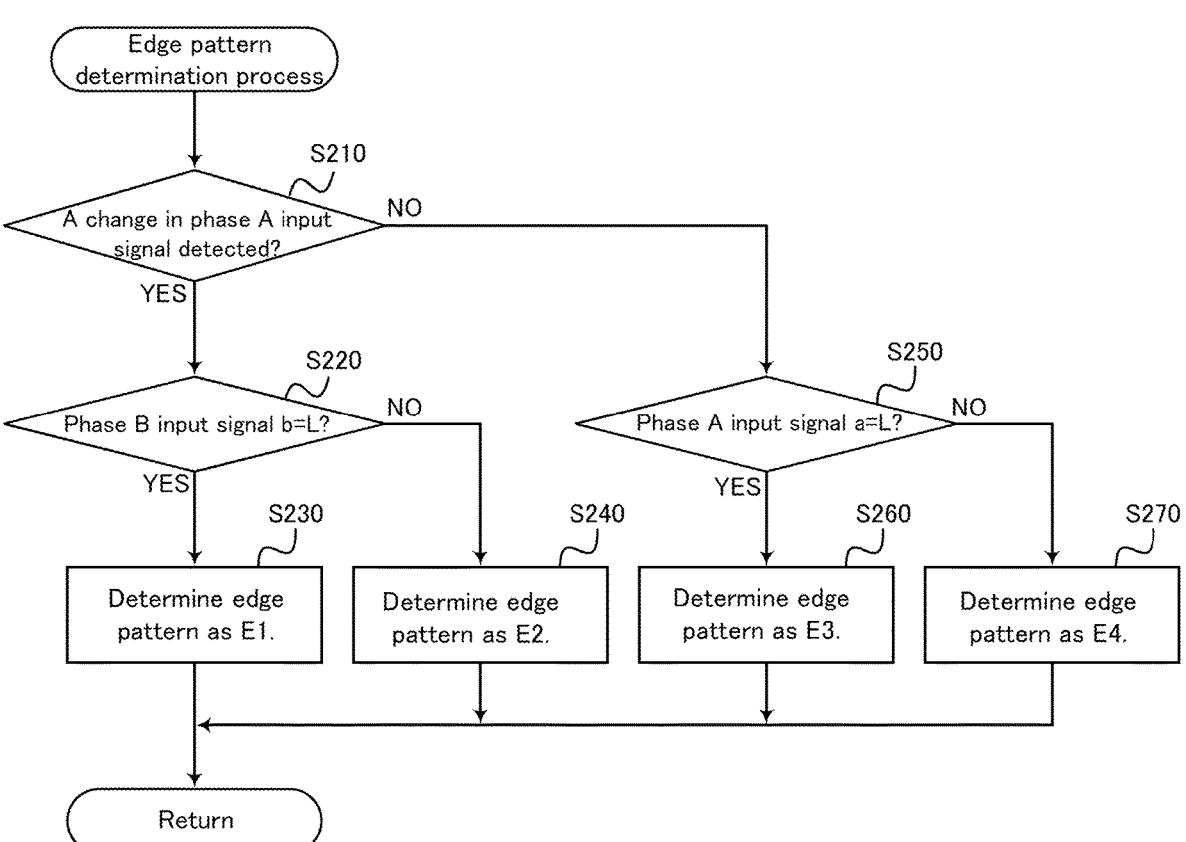
FIG. 6 is a flow diagram of the edge pattern determination process of the rotation determination device according to the embodiment of the present invention.

FIG. 5 and FIG. 6 are used to explain the edge pattern determination process executed in the edge pattern determiner 230 when the rotating body 111 is rotationally operated.

As shown in FIG. 5, in the edge pattern determination process (step S200), edge patterns are classified into four types, E1 to E4, based on the signal change information detected by the detector 220 in step S140 and the input signal levels acquired by the acquisitor 210 in step S150. In the following, the edge pattern determination process in the edge pattern determiner 230 will be explained in detail, illustrating that the data table shown in FIG. 5 is stored in the edge pattern determiner 230 or in a memory (not shown).

As shown in FIG. 6, the edge pattern determiner 230 determines whether the signal change detected by the detector 220 in step S140 is a change in the phase A input signal (step S210).

When it is determined to be a change in the phase A input signal ("YES" in step S210), the process moves to step S220.

When it is determined that it is not a change in the phase A input signal ("NO" in step S210), the process moves to step S250.

Next, the edge pattern determiner 230 determines whether the phase B input signal level b acquired in step S150 is L (step S220).

When the phase B input signal level b acquired in step S150 is determined to be L ("YES" in step S220), the edge pattern is determined to be E1 in the edge pattern determiner 230 (step S230).

When the phase B input signal level b acquired in step S150 is determined not to be L ("NO" in step S220), the edge pattern is determined to be E2 by the edge pattern determiner 230 (step S240).

The edge pattern determiner 230 determines whether the phase A input signal level a acquired in step S150 is L (step S250).

When the phase A input signal level a acquired in step S150 is determined to be L ("YES" in step S250), the edge pattern is determined to be E3 by the edge pattern determiner 230 (step S260).

When the phase A input signal level a acquired in step S150 is determined not to be L ("NO" in step S250), the edge pattern is determined to be E4 in the edge pattern determiner 230 (step S270).

When the edge patterns are determined in step S230, step S240, step S260, and step S270, the edge pattern determination process is terminated.

<Rotation Determination Process (Step S300)>

Figure 7:
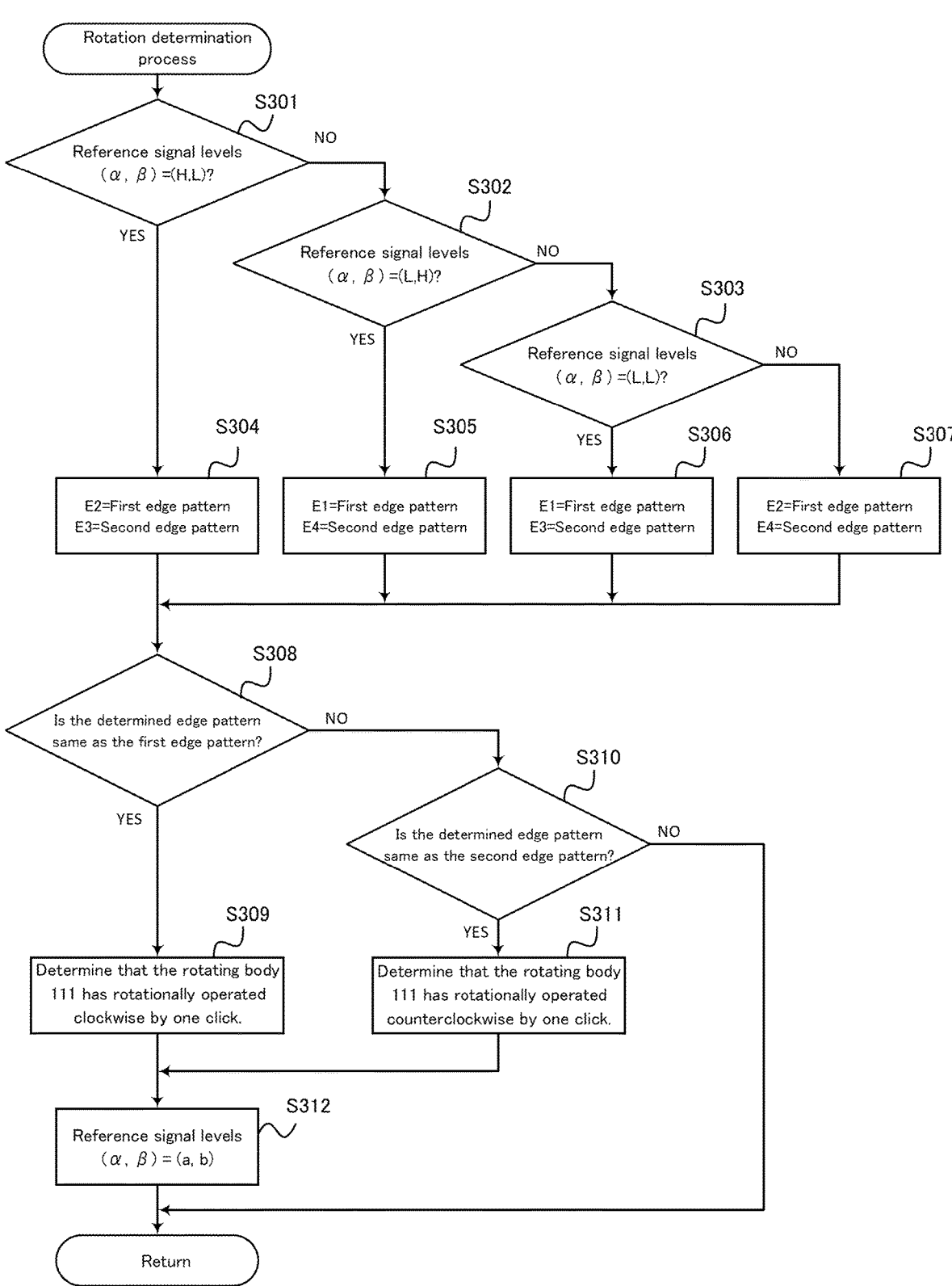
FIG. 7 is a flow diagram of a rotation determination process of the rotation determination device according to the embodiment of the present invention.

The rotation determination process (step S300) is explained using FIG. 7 and FIG. 8.

Steps S301 through S312 described below are all executed by the rotation determiner 250.

In the rotation determination process (step S300), whether the rotating body 111 is rotationally operated is determined based on the edge pattern determined in the edge pattern determination process (step S200) and the reference signal levels (α, β) set in the setter 240. In the following, the rotation determination process in the rotation determiner 250 will be explained in detail, illustrating that the data table shown in FIG. 8 is stored in the rotation determiner 250 or in the memory (not shown).

As shown in FIG. 7, the rotation determiner 250 determines whether the reference signals level set in the setter 240 are the reference signal levels (α, β)=(H, L) (step S301).

When it is determined in the rotation determiner 250 that the reference signal levels (α, β)=(H, L) ("YES" in step S301), the process moves to step S304.

When it is not determined in the rotation determiner 250 that the reference signal levels (α, β)=(H, L) ("NO" in step S301), the process moves to step S302.

Next, the rotation determiner 250 determines whether the reference signal levels set in the setter 240 are the reference signal levels (α, β)=(L, H) (step S302).

When it is determined in the rotation determiner 250 that the reference signal levels (α, β)=(L, H) ("YES" in step S302), the process moves to step S305.

When it is not determined in the rotation determiner 250 that the reference signal levels (α, β)=(L, H) ("NO" in step S303), the process moves to step S303.

The rotation determiner 250 determines whether the reference signal levels set in the setter 240 are the reference signal levels (α, β)=(L, L) (step S303).

When it is determined in the rotation determiner 250 that the reference signal levels (α, β)=(L, L) ("YES" in step S303), the process moves to step S306.

When it is not determined in the rotation determiner 250 that the reference signal levels (α, β)=(L, L) ("NO" in step S303), the process moves to step S307.

Next, in the rotation determiner 250, specific edge patterns (first edge pattern and second edge pattern) are set based on the reference signal levels determined in steps S301 to S303. Specifically, the rotation determiner 250 sets the specific edge patterns (first edge pattern and second edge pattern) by referring to the data table shown in FIG. 8.

Here, the specific edge pattern is the edge pattern that is assumed to be detected first in the edge pattern determiner 230 when the rotational operation is started from the position of the rotating body 111 indicated by the values of the reference signal levels (α, β).

At this time, the rotation determiner 250 has two possible directions of rotational operations of the rotating body 111: clockwise and counterclockwise. Therefore, the first edge pattern and the second edge pattern are set.

In other words, when the reference signal levels (α, β)=(H, L) ("YES" in step S301), E2=first edge pattern, E3=second edge pattern, are set (step S304) and the process moves to step S308.

When the reference signal levels (α, β)=(L, H) ("YES" in step S302), E1=first edge pattern, E4=second edge pattern, are set (step S305), and the process moves to step S308.

When the reference signal levels (α, β)=(L, L) ("YES" in step S303), E1=first edge pattern, E3=second edge pattern, are set (step S306), and the process moves to step S308.

When the reference signal levels (α, β)=(H, H) ("NO" in step S303), E2=first edge pattern, E4=second edge pattern, are set (step S307), and the process moves to step S308.

The rotation determiner 250 determines whether the edge pattern determined in the edge pattern determination process (step S200) matches the first edge pattern set in any one of the processes from step S304 to step S307 (step S308).

When it is determined that the edge pattern determined in the edge pattern determination process (step S200) and the first edge pattern set in any one of the processes from step S304 to step S307 match ("YES" in step S308), the rotation determiner 250 determines that the rotating body 111 has been rotationally operated clockwise for one click (step S309), and the process moves to step S312.

When it is determined that the edge pattern determined in the edge pattern determination process (step S200) does not match the first edge pattern set in any one of the processes from step S304 to step S307 ("NO" in step S308), the process moves to step S310.

The rotation determiner 250 determines whether the edge pattern determined in the edge pattern determination process (step S200) matches the second edge pattern set in any one of the processes from steps S304 to S307 (step S310).

When it is determined that the edge pattern determined in the edge pattern determination process (step S200) and the second edge pattern set in any one of the processes from step S304 to step S307 match ("YES" in step S310), the rotation determiner 250 determines that the rotating body 111 has been rotationally operated counterclockwise for one click (step S311), and the process moves to step S312.

When it is determined that the edge pattern determined in the edge pattern determination process (step S200) does not match the second edge pattern set in any one of the processes from steps S304 to S307 ("NO" in step S310), the rotation determination process (step S300) is terminated.

In the rotation determiner 250, the reference signal levels (α, β) are updated to the phase A input signal level a and phase B input signal level b acquired in step S150 (step S312), and the rotation determination process (step S300) is terminated.

<Timing Chart for when the Rotating Body 111 is Rotationally Operated>

Timing charts when the rotating body 111 is rotationally operated will be described with reference to FIG. 9 to FIG. 13. Note that this timing chart will be described with the timing chart when the rotating body 111 is rotationally operated clockwise as the example.

(When the Rotating Body 111 is Rotationally Operated from the State where the Reference Signal Levels=(H, L))

Figure 9:
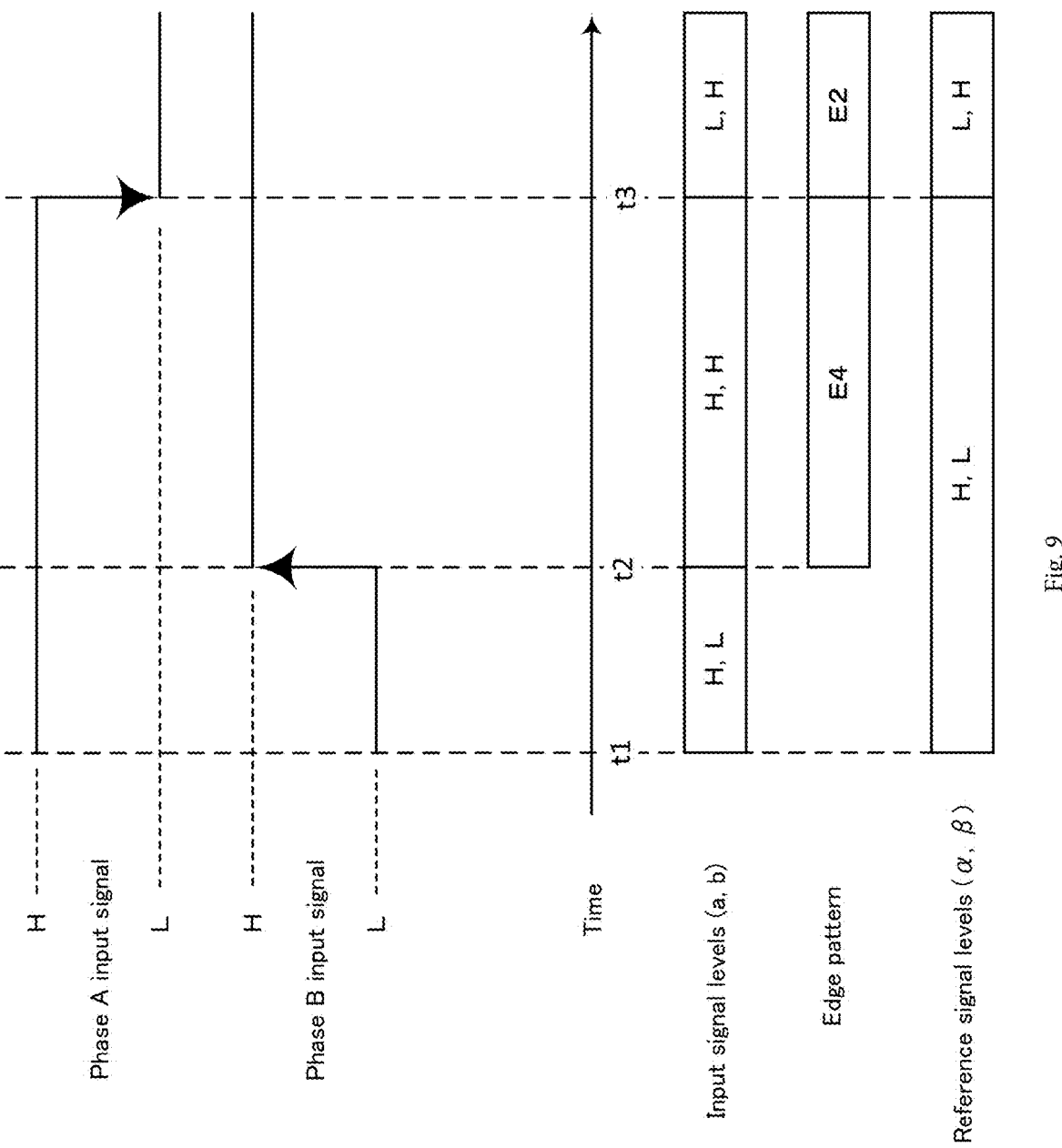
FIG. 9 shows a timing chart when the rotation determination process of the rotation determination device according to the embodiment of the present invention is executed.

The timing chart when the rotating body 111 is rotationally operated clockwise by one click will be described with reference to FIG. 9.

At t1, when CPU power (5 V) is supplied to the CPU 200 and the rotation determination state is set to valid, the input signal levels (a, b)=(H, L) are acquired by the acquisitor 210.

Then, the input signal levels (a, b) acquired by the setter 240 are set to the reference signal levels (α, β).

In other words, the reference signal levels (α, β)=(H, L) are set in the setter 240.

When the rotating body 111 is rotationally operated clockwise and the rising edge of the phase B input signal is detected by the detector 220 at t2, the input signal levels (a, b) is acquired by the acquisitor 210, and the edge pattern determination process is executed in the edge pattern determiner 230.

In other words, the input signal levels (a, b)=(H, H) is acquired by the acquisitor 210, and the edge pattern is determined to be E4 in the edge pattern determiner 230.

Next, in the rotation determiner 250, the specific edge pattern is set based on the reference signal levels (α, β). When the reference signal levels (α, β)=(H, L), E2=first edge pattern and E3=second edge pattern are set.

Since the edge pattern determined by the edge pattern determiner 230 (=E4) does not match the first edge pattern (=E2) and second edge pattern (=E3) set by the rotation determiner 250, the rotation determiner 250 does not determine that the rotation has been operated, and the rotation determination process is terminated.

When the rotating body 111 is further rotationally operated clockwise and the falling edge of the phase A input signal is detected by the detector 220 at t3, the input signal levels (a, b) are acquired by the acquisitor 210, and the edge pattern determination process is executed by the edge pattern determiner 230.

In other words, the input signal levels (a, b)=(L, H) are acquired by the acquisitor 210, and the edge pattern is determined to be E2 in the edge pattern determiner 230.

Next, in the rotation determiner 250, the specific edge pattern is set based on the reference signal levels (α, β). When the reference signal levels (α, β)=(H, L), E2=first edge pattern and E3=second edge pattern are set.

Since the edge pattern determined in the edge pattern determiner 230 (=E2) and the first edge pattern set in the rotation determiner 250 (=E2) match, it is determined in the rotation determiner 250 that the rotating body 111 has been rotationally operated clockwise for one click.

Then, the reference signal levels are updated to (α, β)=(L, H) in the setter 240, and the rotation determination process is terminated.

(When the Rotating Body 111 is Rotationally Operated from the State where the Reference Signal Levels=(L, H))

Figure 10:
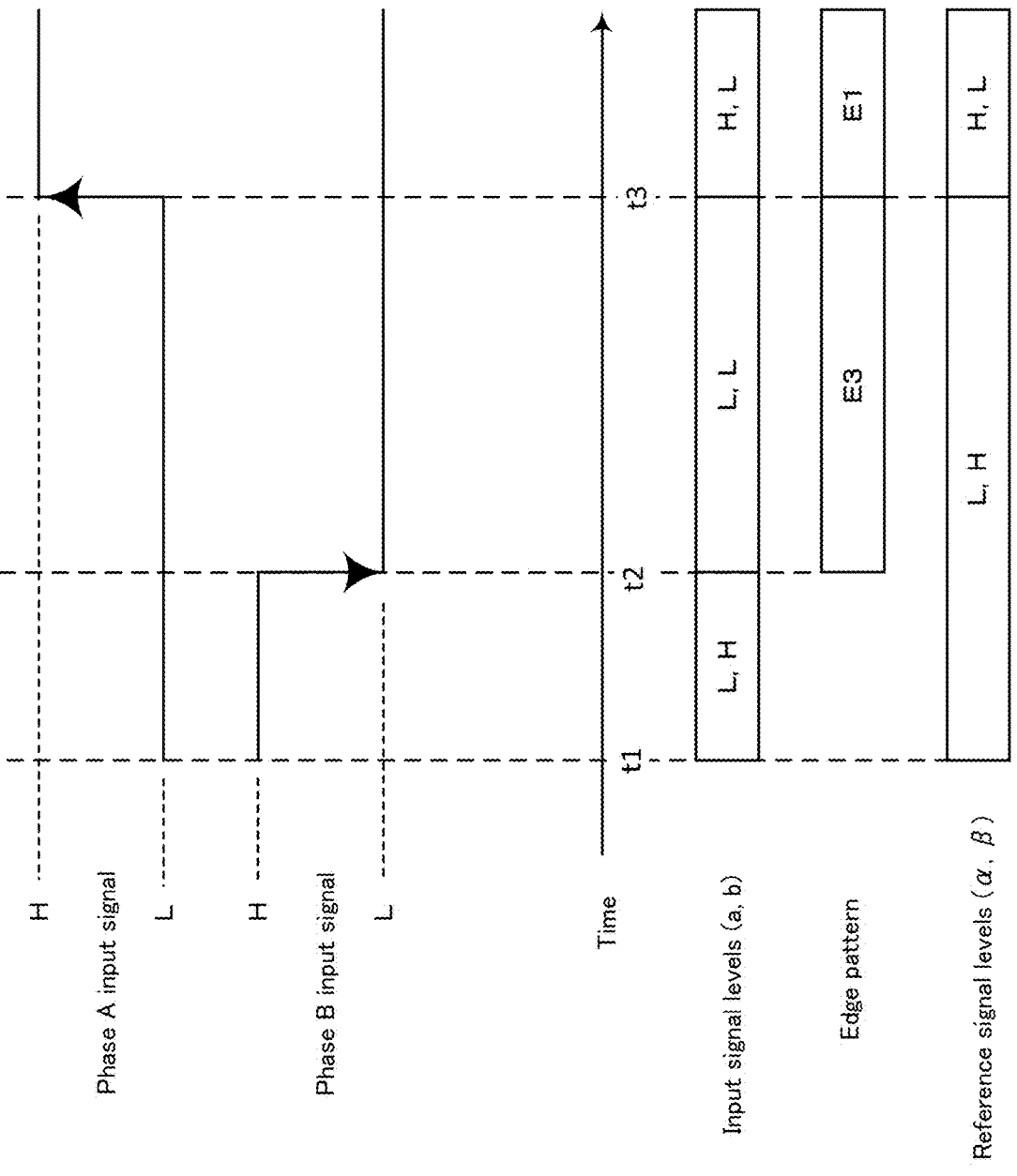
FIG. 10 shows the timing chart when the rotation determination process of the rotation determination device according to the embodiment of the present invention is executed.

The timing chart when the rotating body 111 is rotationally operated clockwise by one click will be described with reference to FIG. 10.

At t1, when CPU power (5 V) is supplied to the CPU 200 and the rotation determination state is made valid, input signal levels (a, b)=(L, H) are acquired by the acquisitor 210.

The input signal levels (a, b) acquired by the setter 240 are set to the reference signal levels (α, β).

In other words, the reference signal levels (α, β)=(L, H) are set in the setter 240.

When the rotating body 111 is rotationally operated clockwise and the falling edge of the phase B input signal is detected by the detector 220 at t2, the input signal levels (a, b) are acquired by the acquisitor 210, and the edge pattern determination process is executed in the edge pattern determiner 230.

In other words, the input signal levels (a, b)=(L, L) are acquired by the acquisitor 210, and the edge pattern is determined to be E3 in the edge pattern determiner 230.

Next, in the rotation determiner 250, the specific edge pattern is set based on the reference signal levels (α, β). When the reference signal levels (α, β)=(L, H), E1=first edge pattern and E4=second edge pattern are set.

Since the edge pattern determined by the edge pattern determiner 230 (=E3) does not match the first edge pattern (=E1) and the second edge pattern (=E4) set by the rotation determiner 250, the rotation determiner 250 does not determine that the rotation has been operated, and the rotation determination process is terminated.

When the rotating body 111 is rotationally operated clockwise and the rising edge of the phase A input signal is detected by the detector 220 at t3, the input signal levels (a, b) are acquired by the acquisitor 210, and the edge pattern determination process is executed in the edge pattern determiner 230.

In other words, the input signal levels (a, b)=(H, L) are acquired by the acquisitor 210, and the edge pattern is determined to be E1 in the edge pattern determiner 230.

Next, in the rotation determiner 250, the specific edge pattern is set based on the reference signal levels (α, β). When the reference signal levels (α, β)=(L, H), E1=first edge pattern and E4=second edge pattern are set.

Since the edge pattern determined in the edge pattern determiner 230 (=E1) and the first edge pattern set in the rotation determiner 250 (=E1) match, it is determined in the rotation determiner 250 that the rotating body 111 has been rotationally operated clockwise for one click.

Then, the reference signal levels are updated to (α, β)=(H, L) in the setter 240, and the rotation determination process is terminated.

(When the Rotating Body 111 is Rotationally Operated from the State where the Reference Signal Levels=(L, L))

As shown in FIG. 2, a state of input signal levels (a, b)=(L, L) indicates that the rotating body 111 is stopped at the intermediate position between two adjacent click stop positions.

In other words, even if the encoder section had a structure that generates clicks, depending on the operator's operation, the rotating body 111 may stop at the intermediate position between two adjacent click stop positions, so the rotation determination device 1 must correctly detect the rotational operation from this position.

Figure 11:
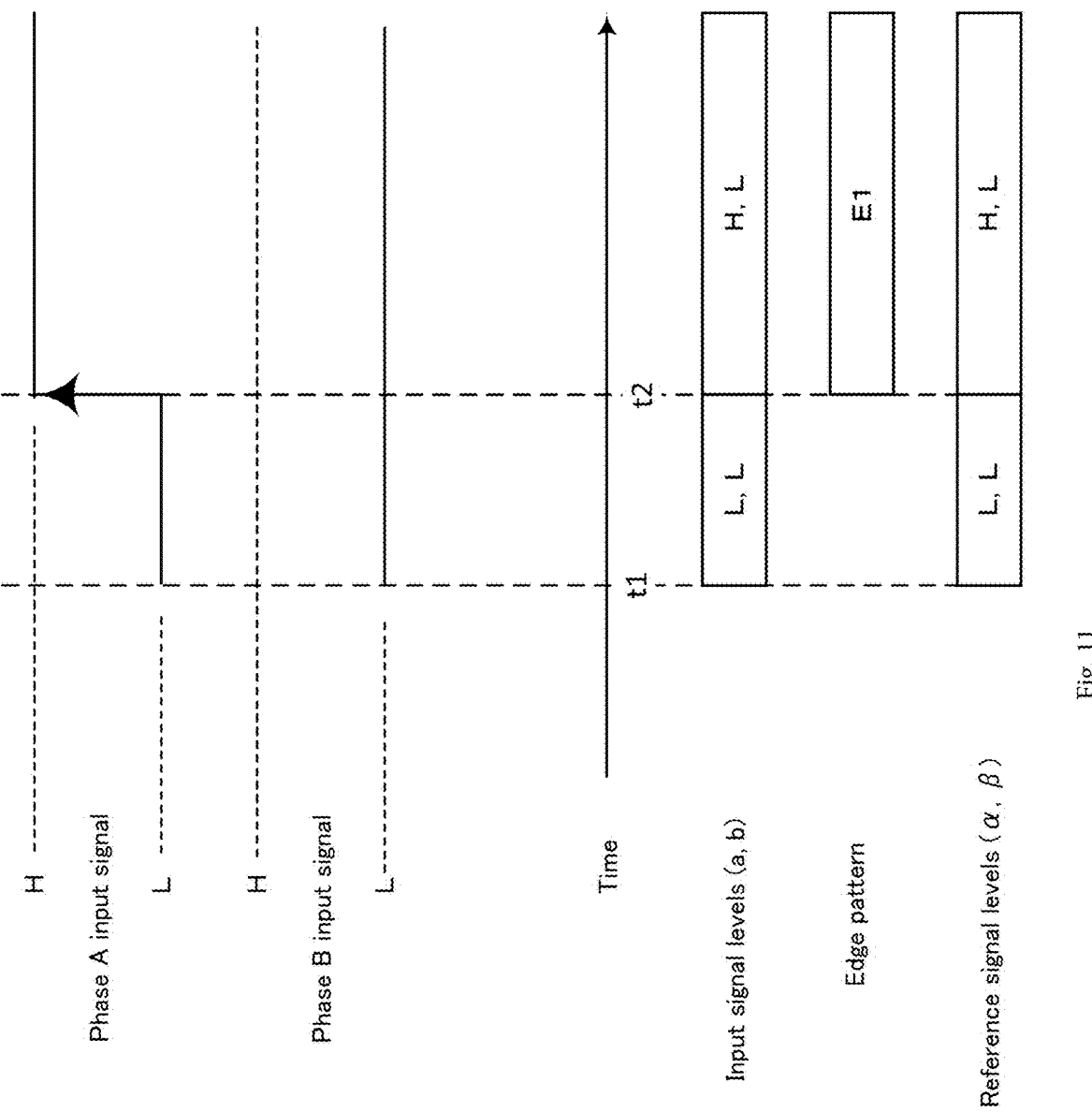
FIG. 11 shows the timing chart when the rotation determination process of the rotation determination device according to the embodiment of the present invention is executed.

The processing of the rotation determination device 1 when the rotating body 111 stopped at the intermediate position is rotationally operated clockwise is described below using FIG. 11.

At t1, when CPU power (5 V) is supplied to the CPU 200 and the rotation determination state is set to valid, the input signal levels (a, b)=(L, L) are acquired by the acquisitor 210.

Then, the input signal levels (a, b) acquired by the setter 240 are set to the reference signal levels (α, β).

In other words, the reference signal levels (α, β)=(L, L) are set in the setter 240.

When the rotating body 111 is rotationally operated clockwise and the rising edge of the phase A input signal is detected by the detector 220 at t2, the input signal levels (a, b) are acquired by the acquisitor 210, and the edge pattern determination process is executed in the edge pattern determiner 230.

In other words, the input signal levels (a, b)=(H, L) are acquired by the acquisitor 210, and the edge pattern is determined to be E1 in the edge pattern determiner 230.

Next, in the rotation determiner 250, the specific edge pattern is set based on the reference signal levels (α, β). When the reference signal levels (α, β)=(L, L), E1=first edge pattern and E3=second edge pattern are set.

Since the edge pattern determined in the edge pattern determiner 230 (=E1) and the first edge pattern set in the rotation determiner (=E1) 250 match, it is determined in the rotation determiner 250 that the rotating body 111 has been rotationally operated clockwise for one click.

In the above timing chart, since the rotational operation of the rotating body 111 is started from the intermediate position between the two adjacent click stop positions, when the rotating body 111 is rotationally operated for half a click, the rotation determiner 250 can determine the rotational operation.

Then, the reference signal levels are updated to (α, β)=(H, L) in the setter 240, and the rotation determination process is terminated.

(When the Rotating Body 111 is Rotationally Operated from the State where the Reference Signal Levels=(H, H))

As shown in FIG. 2, the state of input signal levels (a, b)=(H, H) indicates that the rotating body 111 is stopped at the intermediate position between two adjacent click stop positions.

Figure 12:
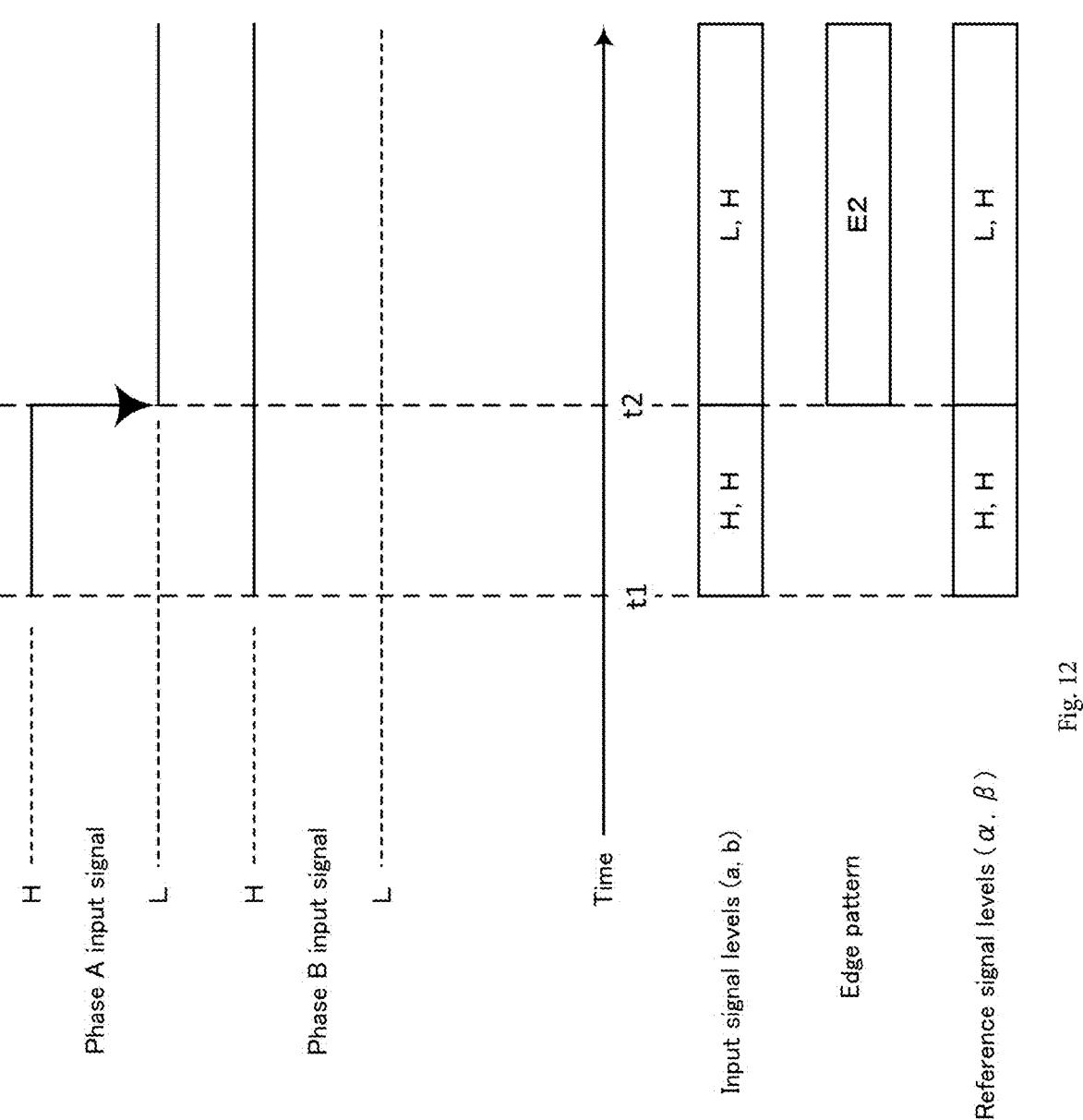
FIG. 12 shows the timing chart when the rotation determination process of the rotation determination device according to the embodiment of the present invention is executed.

The processing of the rotation determination device 1 when the rotating body 111 stopped at the intermediate position between the two adjacent click stop positions is rotationally operated in the clockwise direction, is described below using FIG. 12.

At t1, when CPU power (5 V) is supplied to the CPU 200 and the rotation determination state is set to valid, the input signal levels (a, b)=(H, H) are acquired by the acquisitor 210.

Then, the input signal levels (a, b) acquired by the setter 240 are set to the reference signal levels (α, β).

In other words, the reference signal levels (α, β)=(H, H) are set in the setter 240.

When the rotating body 111 is rotationally operated clockwise and the falling edge of the phase A input signal is detected by the detector 220 at t2, the input signal levels (a, b) are acquired by the acquisitor 210, and the edge pattern determination process is executed in the edge pattern determiner 230.

In other words, the input signal levels (a, b)=(L, H) are acquired by the acquisitor 210, and the edge pattern is determined to be E2 in the edge pattern determiner 230.

Next, in the rotation determiner 250, the specific edge pattern is set based on the reference signal levels (α, β). When the reference signal levels (α, β)=(H, H), E2=first edge pattern and E4=second edge pattern are set.

Since the edge pattern determined in the edge pattern determiner 230 (=E2) and the first edge pattern set in the rotation determiner 250 (=E2) match, it is determined in the rotation determiner 250 that the rotating body 111 has been rotationally operated clockwise for one click.

In the above timing chart, since the rotational operation of the rotating body 111 is started from the intermediate position between the two adjacent click stop positions, when the rotating body 111 is rotationally operated for half a click, the rotation determiner 250 can determine the rotational operation.

Then, the reference signal levels are updated to (α, β)=(L, H) in the setter 240, and the rotation determination process is terminated.

(Prevention of Incorrect Determination Due to Chattering of Phase a Input Signal and Phase B Input Signal)

Figure 13:
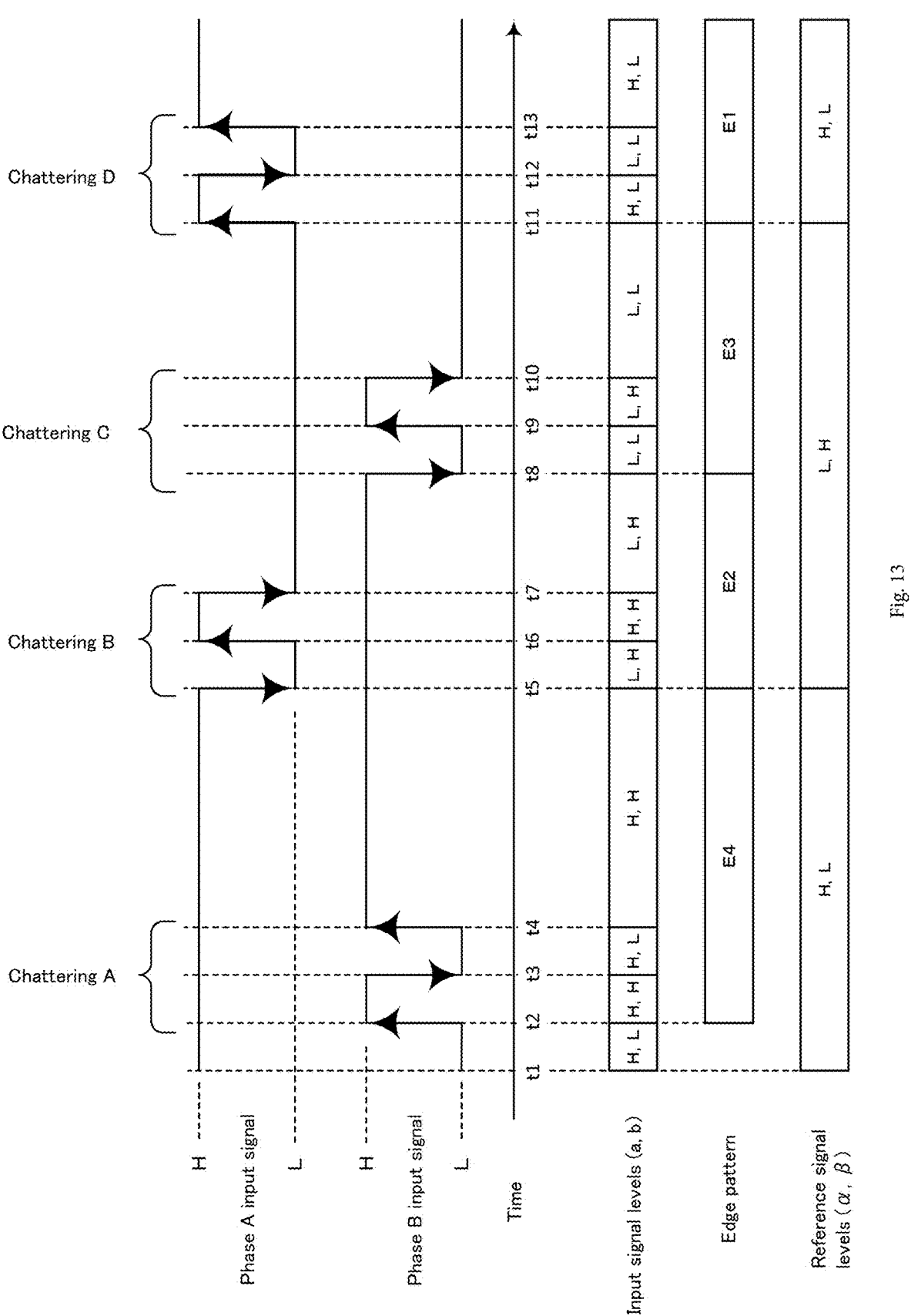
FIG. 13 shows the timing chart when the rotation determination process of the rotation determination device according to the embodiment of the present invention is executed.

As shown in FIG. 13, chattering can occur in the waveforms at the rising and falling of the phase A and B input signals when the rotating body 111 is rotationally operated.

The chattering waveforms that occur when the rotating body 111 is rotationally operated clockwise are classified into four categories, chattering A to chattering D, and the processing executed by the rotation determination device 1 when each chattering waveform occurs is explained.

(Process when Chattering a Occurs)

As shown in FIG. 13, chattering A is the chattering that occurs at the rising of the phase B input signal.

At t1, when CPU power (5 V) is supplied to the CPU 200 and the rotation determination state is set to valid, the input signal levels (a, b)=(H, L) are acquired by the acquisitor 210.

Then, the input signal levels (a, b) acquired by the setter 240 are set to the reference signal levels (α, β).

In other words, the reference signal levels (α, β)=(H, L) is set in the setter 240.

When the rotating body 111 is rotationally operated clockwise and the rising edge of the phase B input signal is detected by the detector 220 at t2, the input signal levels (a, b) are acquired by the acquisitor 210, and the edge pattern determination process is executed in the edge pattern determiner 230.

In other words, the input signal levels (a, b)=(H, H) are acquired by the acquisitor 210, and the edge pattern is determined to be E4 in the edge pattern determiner 230.

Next, in the rotation determiner 250, the specific edge pattern is set based on the reference signal levels (α, β). Specifically, when the reference signal levels (α, β)=(H, L), E2=first edge pattern and E3=second edge pattern are set.

Since the edge pattern determined by the edge pattern determiner 230 (=E4) does not match the first edge pattern (=E2) and second edge pattern (=E3) set by the rotation determiner 250, the rotation determiner 250 does not determine that the rotation has been operated, and the rotation determination process is terminated.

When the falling edge of the phase B input signal is detected by the detector 220 at t3, the timing when the chattering occurs, the input signal levels (a, b) are acquired by the acquisitor 210, and the edge pattern determination process is executed by the edge pattern determiner 230.

In other words, in the acquisitor 210, input signal levels (a, b)=(H, L) are acquired, and the edge pattern is determined to be E4 in the edge pattern determiner 230.

Next, in the rotation determiner 250, the specific edge pattern is set based on the reference signal levels (α, β). When the reference signal levels (α, β)=(H, L), E2=first edge pattern and E3=second edge pattern are set.

Since the edge pattern determined by the edge pattern determiner 230 (=E4) does not match the first edge pattern (=E2) and second edge pattern (=E3) set by the rotation determiner 250, the rotation determiner 250 does not determine that the rotation has been operated, and the rotation determination process is terminated.

At t4, the timing when further chattering occurs, the same processing is executed as for the chattering that occurred at t2, the rotation determiner 250 does not determine that the rotating body 111 has been rotationally operated, and the rotation determination process is terminated.

In other words, no matter how many times chattering A, which occurs at the rising of the phase B input signal, is detected, the rotation determiner 250 will not incorrectly determine the rotational operation.

(Process when Chattering B Occurs)

As shown in FIG. 13, chattering B is the chattering that occurs at the falling of the phase A input signal.

At t5, when the falling edge of the phase A input signal is detected by the detector 220, the input signal levels (a, b) are acquired by the acquisitor 210, and the edge pattern determination process is executed in the edge pattern determiner 230.

In other words, the input signal levels (a, b)=(L, H) are acquired by the acquisitor 210, and the edge pattern is determined to be E2 in the edge pattern determiner 230.

Next, in the rotation determiner 250, the specific edge pattern is set based on the reference signal levels (α, β). When the reference signal levels (α, β)=(H, L), E2=first edge pattern and E3=second edge pattern are set.

Since the edge pattern determined in the edge pattern determiner 230 (=E2) matches the first edge pattern set in the rotation determiner 250 (=E2), it is determined in the rotation determiner 250 that the rotating body 111 has been rotationally operated clockwise for one click.

Then, the reference signal levels are updated to (α, β)=(L, H) in the setter 240, and the rotation determination process is terminated.

When the rising edge of the phase A input signal is detected by the detector 220 at t6, the timing when chattering occurs, the input signal levels (a, b) are acquired by the acquisitor 210, and the edge pattern determination process is executed by the edge pattern determiner 230.

In other words, in the acquisitor 210, input signal levels (a, b)=(H, H) are acquired, and the edge pattern is determined to be E2 in the edge pattern determiner 230.

Next, in the rotation determiner 250, the specific edge pattern is set based on the reference signal levels (α, β). When the reference signal levels (α, β)=(L, H), E1=first edge pattern and E4=second edge pattern are set.

Since the edge pattern determined by the edge pattern determiner 230 (=E2) does not match the first edge pattern (=E1) and the second edge pattern (=E4) set by the rotation determiner 250, the rotation determiner 250 does not determine that the rotation has been operated, and the rotation determination process is terminated.

At t7, the timing when further chattering occurs, when the falling edge of the phase A input signal is detected by the detector 220, the input signal levels (a, b) are acquired by the acquisitor 210, and the edge pattern determination process is executed by the edge pattern determiner 230.

In other words, the input signal levels (a, b)=(L, H) are acquired by the acquisitor 210, and the edge pattern is determined to be E2 in the edge pattern determiner 230.

Next, in the rotation determiner 250, the specific edge pattern is set based on the reference signal levels (α, β). When the reference signal levels (α, β)=(L, H), E1=first edge pattern and E4=second edge pattern are set.

Since the edge pattern determined by the edge pattern determiner 230 (=E2) does not match the first edge pattern (=E1) and the second edge pattern (=E4) set by the rotation determiner 250, the rotation determiner 250 does not determine that the rotation has been operated, and the rotation determination process is terminated.

In other words, no matter how many times a change in the phase A input signal due to chattering occurs after t5, the rotation determiner 250 does not incorrectly determine the rotational operation.

(Process when Chattering C Occurs)

As shown in FIG. 13, chattering C is the chattering that occurs at the falling of the phase B input signal.

At t8, when the falling edge of the phase B input signal is detected by the detector 220, the input signal levels (a, b) are acquired by the acquisitor 210, and the edge pattern determination process is executed in the edge pattern determiner 230.

In other words, the input signal levels (a, b)=(L, L) are acquired by the acquisitor 210, and the edge pattern is determined to be E3 in the edge pattern determiner 230.

Next, in the rotation determiner 250, the specific edge pattern is set based on the reference signal levels (α, β). When the reference signal levels (α, β)=(L, H), E1=first edge pattern and E4=second edge pattern are set.

Since the edge pattern determined by the edge pattern determiner 230 (=E3) does not match the first edge pattern (=E1) and the second edge pattern (=E4) set by the rotation determiner 250, the rotation determiner 250 does not determine that the rotation has been operated, and the rotation determination process is terminated.

When the rising edge of the phase B input signal is detected by the detector 220 at t9, the timing when chattering occurs, the input signal levels (a, b) are acquired by the acquisitor 210, and the edge pattern determination process is executed by the edge pattern determiner 230.

In other words, in acquisitor 210, input signal levels (a, b)=(L, H) are acquired, and the edge pattern is determined to be E3 in the edge pattern determiner 230.

Next, in the rotation determiner 250, the specific edge pattern is set based on the reference signal levels (α, β). When the reference signal levels (α, β)=(L, H), E1=first edge pattern and E4=second edge pattern are set.

Since the edge pattern determined by the edge pattern determiner 230 (=E2) does not match the first edge pattern (=E1) and the second edge pattern (=E3) set by the rotation determiner 250, the rotation determiner 250 does not determine that the rotation has been operated, and the rotation determination process is terminated.

At t10, the timing when further chattering occurs, the same processing as for the chattering that occurred at t8 is executed, the rotation determiner 250 does not determine that the rotating body 111 has been rotationally operated, and the rotation determination process is terminated.

In other words, no matter how many times a change in the phase B input signal due to chattering occurs after t8, the rotation determiner 250 does not incorrectly determine the rotational operation.

(Process when Chattering D Occurs)

As shown in FIG. 13, chattering D is chattering that occurs at the rising of the phase A input signal.

At t11, when the rising edge of the phase A input signal is detected by the detector 220, the input signal levels (a, b) are acquired by the acquisitor 210, and the edge pattern determination process is executed by the edge pattern determiner 230.

In other words, in the acquisitor 210, the input signal levels (a, b)=(H, L) are acquired, and the edge pattern is determined to be E1 in the edge pattern determiner 230.

Next, in the rotation determiner 250, the specific edge pattern is set based on the reference signal levels (α, β). When the reference signal levels (α, β)=(L, H), E1=first edge pattern and E4=second edge pattern are set.

Since the edge pattern determined in the edge pattern determiner 230 (=E1) matches the first edge pattern set in the rotation determiner 250 (=E1), it is determined in the rotation determiner 250 that the rotating body 111 has been rotationally operated clockwise for one click.

Then, the reference signal levels are updated to (α, β)=(H, L) in the setter 240, and the rotation determination process is terminated.

When the falling edge of the phase A input signal is detected by the detector 220 at t12, the timing when chattering occurs, the input signal levels (a, b) are acquired by the acquisitor 210, and the edge pattern determination process is executed by the edge pattern determiner 230.

In other words, the input signal levels (a, b)=(L, L) are acquired by the acquisitor 210, and the edge pattern is determined to be E1 in the edge pattern determiner 230.

Next, in the rotation determiner 250, the specific edge pattern is set based on the reference signal levels (α, β). When the reference signal levels (α, β)=(H, L), E2=first edge pattern and E3=second edge pattern are set.

Since the edge pattern determined by the edge pattern determiner 230 (=E1) does not match the first edge pattern (=E2) and the second edge pattern (=E3) set by the rotation determiner 250, the rotation determiner 250 does not determine that the rotation has been operated, and rotation determination process is terminated.

At t13, the timing when further chattering occurs, when the rising edge of the phase A input signal is detected by the detector 220, the input signal levels (a, b) are acquired by the acquisitor 210, and the edge pattern determination process is executed by the edge pattern determiner 230.

In other words, input signal levels (a, b)=(H, L) are acquired by acquisitor 210, and the edge pattern is determined to be E1 in the edge pattern determiner 230.

Next, in the rotation determiner 250, the specific edge pattern is set based on the reference signal levels (α, β). When the reference signal levels (α, β)=(H, L), E2=first edge pattern and E3=second edge pattern are set.

Since the edge pattern determined by the edge pattern determiner 230 (=E1) does not match the first edge pattern (=E2) and the second edge pattern (=E3) set by the rotation determiner 250, the rotation determiner 250 does not determine that the rotating body 111 has been rotationally operated, and the rotation determination process is terminated.

In other words, no matter how many times a change in the phase A input signal due to chattering occurs after t11, the rotation determiner 250 does not incorrectly determine the rotational operation.

The above description of the processing of the rotation determination device 1 is based on the example of when the rotating body 111 is rotationally operated in a clockwise direction, but the processing executed when the rotating body 111 is operated in a counterclockwise direction is the same as the processing described above.

<Effects>

As described above, the rotation determination device 1 according to the present embodiment comprises:

the encoder section 100 configured to generate two pulse signals (phase A input signal and phase B input signal) that are out of phase with each other due to rotation of the rotating body 111;

the acquisitor 210 configured to acquire the levels of the two pulse signals;

the detector 220 configured to detect the rising and falling edges of the two pulse signals;

the edge pattern determiner 230 configured to determine the edge pattern from one pulse signal in which the signal change is detected and the input signal levels in the other pulse signal when a signal change is detected in the detection section 220; the setter 240 configured to set the reference signal levels with the input signal levels as the initial value; and the rotation determiner 250 configured to determine rotation based on the specific edge pattern that is changed according to the reference signal levels and the edge pattern determined by the edge pattern determiner 230.

The rotation determination device 1 according to the present embodiment comprises:

the encoder section 100 configured to generate two pulse signals (phase A input signal and phase B input signal);

the acquisitor 210 configured to acquire the levels of the two pulse signals;

the detector 220 configured to detect a signal change in the two pulse signals;

the edge pattern determiner 230 configured to acquire the signal level and determine the edge pattern when the change in one of the two pulses is detected;

the setter 240 that sets the reference signal levels; and the rotation determiner 250 configured to determine whether the rotating body 111 has been rotationally operated.

When the specific edge pattern determined by the reference signal levels matches the edge pattern determined by the edge pattern determiner 230, the rotation determiner 250 determines that the rotating body 111 has been rotationally operated.

In other words, in the rotation determination device 1, the reference signal levels are set at the operation start position of the rotating body 111, and when the edge pattern determined by the signal change detected in one of the two pulse signals matches the specific edge pattern set by the reference signal levels, the rotating body 111 is determined to have been rotationally operated.

Therefore, even if the operation start position of the rotating body 111 is at the intermediate position, the rotational operation of the rotating body 111 can be determined since the reference signal levels are set at the intermediate position.

Also, since the reference signal levels are set based on the input signal levels, even if chattering occurs between the two pulse signals, the rotation can be determined without incorrect determination.

According to the rotation determination device 1 of the present embodiment, the specific edge pattern is distinguished between the first edge pattern and the second edge pattern. When the edge pattern is the first edge pattern, the rotating body 111 is determined to be rotationally operated clockwise, and when the edge pattern is the second edge pattern, the rotating body 111 is determined to be rotationally operated counterclockwise.

In other words, the rotation determination device 1 distinguishes the specific edge patterns determined based on the reference signal levels in to two: the first edge pattern and the second edge pattern.

Therefore, since the specific edge pattern configured to determine that the rotating body 111 has been rotationally operated is distinguished into the first edge pattern configured to determine that the rotating body 111 has been rotationally operated clockwise and the second edge pattern configured to determine that the rotating body 111 has been rotationally operated counterclockwise, the direction of the rotational operation can be determined.

According to the rotation determination device 1 of the present embodiment, if the edge pattern is the specific edge pattern, the reference signal levels are updated to the input signal levels of when the specific edge pattern is determined.

In other words, the rotation determination device 1 can correctly determine successive rotational operations of the rotating body 111 since when the edge pattern matches the specific edge pattern, the reference signal levels are updated to the input signal levels of when the edge pattern matches the specific edge pattern.

When the edge pattern and the specific edge pattern match, since the reference signal levels are updated to the input signal levels of when the edge pattern matches the specific edge pattern, the rotation determination can be made without incorrect determination even when chattering occurs in the two pulse signals.

According to the rotation determination device 1 of the present embodiment, the phase A input signal level and the phase B input signal level when the CPU power is supplied and the rotation determination state is set to valid are acquired by the acquisitor 210, and the reference signal levels are set in the setter 240 based on the acquired input signal levels. This allows the operation start position of the rotating body 111 to be specified.

In the edge pattern determiner 230, when the rotating body 111 is rotationally operated and the change in the input signals are detected, the edge patterns generated by the rotating body 111 are classified into four (E1-E4) based on the change in the input signals and the level of the input signals other than the input signals at which the change occurred.

In other words, the edge pattern determiner 230 determines which of the four edge patterns (E1-E4) determined from the combination of changes and the signal levels (H or L) of the two pulse signals have been detected.

In the rotation determiner 250, the edge pattern (specific edge pattern) is set that is assumed to be determined first in the edge pattern determiner 230 when the rotating body 111 is rotationally operated from the operation start position.

In other words, the rotation determiner 250 can uniquely set the edge pattern that first occurs when the rotating body 111 is rotationally operated, since the operation start position of the rotating body 111 can be specified from the reference signal levels.

At this time, the first edge pattern and the second edge pattern are set in the rotation determiner 250 since there are two edge patterns: the edge pattern that is determined in the edge pattern determiner 230 when the rotating body 111 is rotationally operated clockwise, and the edge pattern that is determined in the edge pattern determiner 230 when the rotating body 111 is rotationally operated counterclockwise.

In the rotation determiner 250, the two edge patterns (specific edge patterns) set in the rotation determiner 250 are compared with the edge pattern determined in the edge pattern determiner 230, and when they match, the rotating body 111 is determined to have been rotationally operated.

In other words, according to the rotation determination device 1 of the present embodiment, the rotational operation of the rotating body 111 is determined by the signal levels of the phase A input signal and phase B input signal before the rotational operation and the edge patterns detected by the rotational operation of the rotating body 111.

Therefore, it is possible to determine in which direction the rotating body 111 has been rotationally operated, even if the operation start position of the rotating body 111 was in the intermediate position.

<Modification>

Even though above-mentioned rotation determination device 1 was explained using the example of the encoder section with a structure that generates clicks, the encoder section with the structure that does not generate clicks may also be used.

Since the phase A input signal level a and the phase B input signal level b before the rotating body 111 is rotationally operated are set to the reference levels ($\alpha$ and $\beta$), the rotation of the rotating body 111 can be determined by the above-mentioned rotation determination process even for the encoder section with the structure that does not generate clicks.

The rotation determination device of the present invention can be realized by recording the processes of the acquisitor 210, the detector 220, the edge pattern determiner 230, the setter 240, and the rotation determiner 250 on a recording medium readable by a computer system, and having the program recorded on this recording medium be read into and executed by the acquisitor 210, the detector 220, the edge pattern determiner unit 230, the setter 240, and the rotation determiner 250. The computer system as used herein may include an operating system and hardware such as peripheral devices.

The "computer system" shall also include the homepage provision environment (or display environment) if the WWW (World Wide Web) system is used. The above program may be transmitted from the computer system that stores this program in a storage device, etc., to another computer system via a transmission medium or by transmission waves in the transmission medium. Here, "transmission medium" for transmitting the program refers to a medium having the function of transmitting information, such as a network such as the Internet (communication network) and a communication channel such as a telephone line (communication line).

The above programs may also be those that can be used to realize some of the aforementioned functions. Furthermore, it may be a so-called difference file (difference program), which can realize the aforementioned functions in combination with a program already recorded in the computer system.

The above embodiments of this invention have been described in detail with reference to the drawings. However, specific configurations are not limited to these embodiments, and designs, etc. that do not depart from the gist of this invention are also included.

EXPLANATION OF THE REFERENCE NUMERALS

1 Rotation determination device
100 Encoder section
110 Encoder
111 Rotating body
112 Switch
113 Switch
200 CPU
210 Acquisitor
220 Detector
230 Edge Pattern Determiner
240 Setter
250 Rotation Determiner

What is claimed is:

1. A rotation determination device comprising:

an encoder connected to a rotating body and configured to generate two pulse signals that are out of phase with each other due to a rotation of the rotating body;

a detector configured to detect a rising edge and a falling edge of the two pulse signals as a signal change;

an acquisitor configured to acquire levels of the two pulse signals received from the encoder as input signal levels;

a setter configured to set reference signal levels as the input signal levels, when power is initially supplied to the encoder;

an edge pattern determiner configured to determine an edge pattern based on the detected signal change in one of the pulse signals and an unchanged input signal level (H level or L level) of the remaining pulse signal;

a memory configured to store edge patterns corresponding to the reference signal levels in states where the two pulse signals match ("H, H", "L, L") and reference signal levels in states where the two pulse signals differ ("H, L", "L, H"), and a rotation determiner that compares the edge pattern determined by the edge pattern determiner with the specific edge patterns stored in the memory, and that is configured to determine that the rotating body has been rotationally operated when the edge pattern determined by the edge pattern determiner matches the specific edge pattern.

2. The rotation determination device according to claim 1, wherein the specific edge pattern is distinguished between a first edge pattern and a second edge pattern, and the rotating body is determined to have been rotationally operated clockwise when the edge pattern is the first edge pattern, and the rotating body is determined to have been rotationally operated counterclockwise when the edge pattern is the second edge pattern.

3. The rotation determination device according to claim 1, wherein when the edge pattern of the edge pattern determiner matches the specific edge pattern of the memory, the reference signal level is updated to reflect the input signal level of the edge pattern.

4. The rotation determination device according to claim 1, wherein when the edge pattern of the edge pattern determiner does not match the specific edge pattern of the memory, the reference signal level remains unchanged.

* * * * *